Jan. 12, 1954 R. H. DICKE 2,666,134

WAVEGUIDE MIXER

Filed April 3, 1945 2 Sheets-Sheet 1

INVENTOR.
ROBERT H. DICKE

BY William D. Hall.

ATTORNEY

Jan. 12, 1954

R. H. DICKE 2,666,134

WAVEGUIDE MIXER

Filed April 3, 1945

2 Sheets-Sheet 2

*INVENTOR.*
ROBERT H. DICKE
*BY* William D. Hall
*ATTORNEY*

Patented Jan. 12, 1954 2,666,134

UNITED STATES PATENT OFFICE 2,666,134

WAVEGUIDE MIXER

Robert H. Dicke, Cambridge, Mass., assignor, by mesne assignments, to the United States of America as represented by the Secretary of War Application April 3, 1945, Serial No. 586,413

18 Claims. (Cl. 250—20)

This invention relates to transmission systems and more particularly to wave guide systems.

According to conventional theory certain elements, such as vacuum tubes, silicon crystals and other elements possessing non-linear electrical characteristics, may be used as mixers or, as they will be referred to later, frequency changing means. When energy of two radio frequencies is impressed across such an element and a load, energy of several new frequencies will appear across the load. Included will be energy of a frequency equal to the difference of the two frequencies of energy at the input, hence the term frequency changer or mixer. In radio work this energy of difference-frequency is utilized and called energy of intermediate frequency. Intermediate frequency will consistently be referred to as the IF frequency. In the normal case energy of one frequency is supplied as a signal, and energy of a second frequency is supplied by a local oscillator. In high gain receivers, however, noise of sufficient magnitude to be undesirable also appears in the output of the local oscillator and at such frequencies as to combine at the mixer and produce noise at the IF frequency.

Most frequency changing means, depending for their operation as they do upon their non-linear electrical characteristics, have impedances which vary with the phases of the energies being impressed upon them. Therefore, a frequency changing means which is a properly matched part of a complete system at one instant of a cycle will be mismatched at another instant of the cycle. This variation of impedance and subsequent mismatch is highly undesirable.

In many applications of radio where transmission and reception are accomplished at the same frequency, it is highly desirable to have automatic frequency control hereinafter also referred to as AFC. When other radio sets are in operation nearby and operating at approximately the same frequency, transmission from these nearby sets may affect these AFC circuits. To eliminate this, various methods have been employed to secure control of the frequency during transmission only. These methods include use of directional couplers and other methods in which any signal will be very highly attenuated or reduced in magnitude. Since transmission is normally at a much higher level than reception, these methods insure that AFC will be affected by transmission only. When such an AFC system is used, two mixers are generally used. This necessitates the use of either two local oscillators or two outlets on one local oscillator.

In systems for mixing signal energy and local oscillator energy used heretofore, another objection was that energy from the local oscillator could and was being radiated. For military and civilian purposes this is highly undesirable.

An object of this invention, therefore, is to provide a mixing circuit wherein signal energy and local oscillator energy may be combined without noise from the local oscillator appearing at the output of the mixing circuit.

Another object of this invention is to provide a mixing circuit wherein signal energy and local oscillator energy may be combined without causing radiation of energy from the local oscillator.

A further object of this invention is to provide a signal mixing circuit and an AFC mixing circuit which circuits are fed from a single local oscillator source.

A still further object of this invention is to provide a mixing circuit wherein signal and automatic frequency control mixing are performed by the same mixer and the signal and AFC output energies are segregated after the mixing.

Another and still further object of this invention is to provide a mixing circuit in which the effect of mixer impedance variation is minimized.

In my copending patent application, Serial No. 584,226 filed March 22, 1945, now Patent No. 2,547,378 granted April 3, 1951, I have disclosed a radio frequency mixer employing a simple waveguide in which a pair of crystal detectors are mounted at spaced points and fed by the signals to be mixed, one of the detectors being fed by the signals in phase and the other being fed by the signals in 180° phase opposition. Such an arrangement eliminates undesirable products of the mixing circuit from the intermediate frequency circuits coupled thereto.

In the present application I obtain the desirable results of the system disclosed in patent application Serial No. 584,226 and further avoid undesirable interaction between the signals to be mixed.

The above-mentioned objects are achieved by employing four waveguide arms connected together to form a T-bridge with the signals to be mixed coupled to a pair of these arms and a pair of crystal detectors coupled to the remaining arms in a manner whereby the crystals are fed in phase with one of the signals and out of phase with the other.

For a better understanding of the invention, together with other and further objects thereof, reference is had to the following description taken in connection with the accompanying drawings in which.

Figures 1, 2:
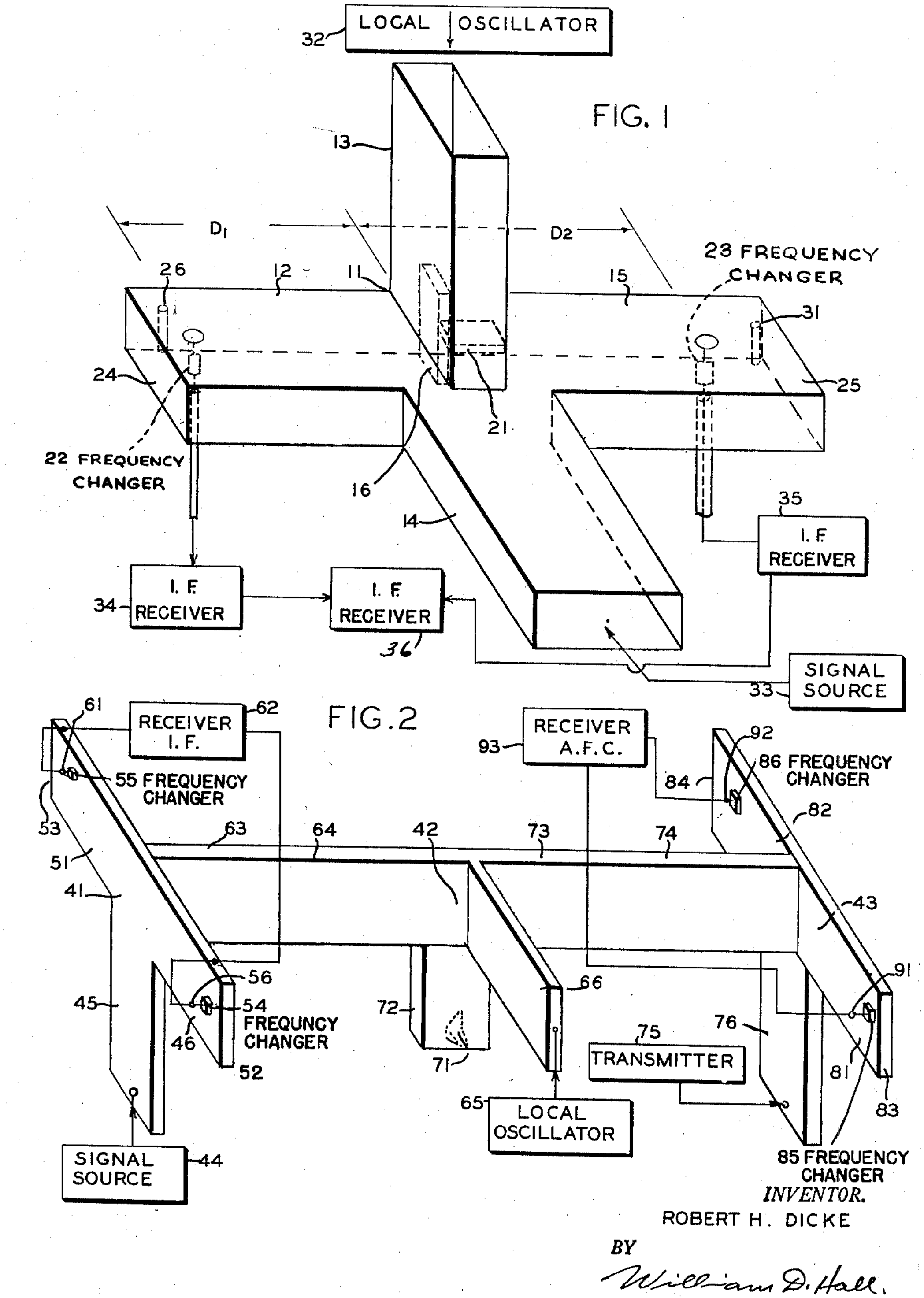
Fig. 1 shows a wave guide frequency changer circuit toward which this invention is directed.
Fig. 2 shows an embodiment of the frequency changer circuit of Fig. 1 having separate signal and AFC outputs.

Referring now particularly to Fig. 1, there is shown a wave guide frequency changing circuit which employs a T-bridge 11. The T-bridge 11 comprises of branches 12, 13, 14, and 15. To form a T-bridge, the branches 12–15 inclusive must have the following relationship. The axes of the four branches must meet in a point. A first and second of these branches must be symmetrical with respect to a plane which passes through the axes of the third and fourth branches and which plane is also perpendicular to the electric lines of force within one of the third and fourth branches. Further, the third and fourth branches are so disposed that the electric lines of force therein are mutually perpendicular. The term T-bridge, as used in the specification and claims, shall be understood to be the bridge that is defined in the prior two sentences. In the preferred embodiment the axes of the first and second branches are colinear and the axes of the third and fourth branches are mutually perpendicular to each other and to the axes of the first and second branches. Neither the preferred embodiment nor the designation of branch numbers for purposes of explanations are to be taken as any limitation of the invention herein described. The T-bridge also includes irises or curtains 16 and 21. The irises 16 and 21 are so arranged at the junction of branches 12, 13, 14, and 15 and are of such dimensions that when T-bridge 11 is observed from any branch, the branch is terminated in its characteristic impedance. This, then, is a matched termination, and the T-bridge is sometimes referred to as a matched junction. Though matching is preferable, the invention being described does not require that the T-bridge be matched and, therefore, the invention is not to be limited to such junctions. Frequency changers 22 and 23 are inserted in branches 12 and 15 in a manner well known in the art. The frequency changers 22 and 23 are located at electrical distances $D_1$ and $D_2$ from the center of the T-bridge 11. The frequency changers 22 and 23 are designed to approximately terminate the branches 12 and 15 in their characteristic impedance. Where considerable matching difficulty is encountered due to variation of the impedance of the frequency changing means 22 and 23, it is advisable to make the difference between the electrical distances $D_1$ and $D_2$ an odd number of quarter wave lengths. This may be accomplished by adding physical length to either wave guide branch 12 or 15 by inserting in one of the branches 12 or 15 the proper amount of a dielectric such as polystyrene. When $D_1$ and $D_2$ differ by an odd number of quarter wave lengths, some absorptive load (not shown) is placed within the branch 13 which connects to a local oscillator 32. Neither the quarter wave insert nor the absorptive load have been incorporated in any of the drawings. Otherwise, the distances $D_1$ and $D_2$ need bear no specific relationship to each other, however, for manufacturing reasons they are generally equal. The most common practice at present is to terminate the branches 12 and 15 in short circuits 24 and 25 and use tuning screws 26 and 31 to adjust for a matched termination. Other terminations and tuning means are known to the art and may be used. Therefore, this invention is not to be limited to the termination and tuning means herein illustrated and described. A local oscillator 32 is connected to the branch 13. A source of radio frequency signal energy 33 is connected to the branch 14. Intermediate frequency (IF) energy is picked up by the IF amplifiers 34 and 35 from frequency changers 22 and 23 respectively and the outputs of both these amplifier stages are applied in common to the succeeding IF receiver stage 36 as is shown in the patent application S. N. 584,226 mentioned above.

The signal energy from the source 33 will divide at the junction of the T-bridge 11 and pass on to the frequency changers 22 and 23. This energy will arrive at the frequency changers 22 and 23 in phase. Fundamental energy from local oscillator 32 will divide at the junction of the T-bridge 11 and pass on to the frequency changers 22 and 23. This energy will arrive at the frequency changers 22 and 23 in 180° phase opposition. One of the properties and advantages of using the T-bridge 11 is that energy from the local oscillator 32 will not pass into the branch 14 carrying the signal energy and, therefore, it cannot be radiated. The fundamental energy from the oscillator 32 and the energy from the signal source 33 will be combined at the frequency changers 22 and 23 and produce IF energy which is fed to IF amplifiers 34 and 35. This IF energy will be referred to as first IF energy. This first IF energy will be in phase or in 180° phase opposition at the IF amplifiers 34 and 35 depending upon the manner in which the frequency changers 22 and 23 have been connected. If the difference in electrical distances from the center of the T-bridge 11 to the frequency changing means 22 and 23 is an odd number of quarter wave lengths, any reflections which occur at the frequency changing means will, upon return to the junction at the T-bridge, pass into the branch 13. Noise energy from the local source 32 passing through branch 13 arrives at the frequency changers 22 and 23 in 180° phase opposition just as did the fundamental energy of local oscillator 32. The resulting IF energy produced by the fundamental energy and the noise energy from the local oscillator will be in 180° phase opposition or in phase at the IF amplifiers 34 and 35 depending upon the manner in which the frequency changers 22 and 23 have been connected. This IF energy will be referred to as second IF energy. If the frequency changers 22 and 23 have been connected so that the first IF energy is fed in phase to receivers IF's 34 and 35, this first IF energy can be added directly in IF receiver 36. It will be noted that if this is done the second IF energy fed to the IF amplifiers 34 and 35, being in 180° opposition, will cancel out in IF receiver 36. By the same reasoning if the frequency changers 22 and 23 are connected to produce first IF energy in 180° phase opposition, second IF energy fed to the IF amplifiers 34 and 35 will again cancel out in IF receiver 36. It can also be shown that these same advantages are also manifest when positions occupied by the local oscillator 32 and radio frequency signal source 33 are interchanged. Because the frequency changing circuit of Fig. 1 gives two outputs of substantially equal magnitude, it will be referred to as a balanced frequency changing circuit.

Referring now to Fig. 2, there is shown a balanced signal frequency changing circuit in combination with a balanced automatic frequency control (AFC) frequency changing circuit which utilizes three T-bridges, 41, 42, and 43. All three of these T-bridges meet the conditions set forth for the T-bridge of Fig. 1. A source 44 of radio frequency signal energy is connected to branch 45 of the T-bridge 41. Wave guide branches 46 and 51 of T-bridge 41 are suitably terminated at 52 and 53 and provided with frequency changing means 54 and 55. Suitable coupling means 56 and 61 connect frequency changing means 54 and 55 to a receiver IF 62. A branch 63 of T-bridge 41 connects to a branch 64 of the T-bridge 42. A local oscillator source 65 connects to a branch 66 of the T-bridge 42. An absorptive load 71 terminates a branch 72 of the T-bridge 42. A branch 73 of T-bridge 42 connects to a branch 74 of the T-bridge 43. A transmitter 75 is connected to branch 76 of T-bridge 43 in a manner well known in the art. Wave guide branches 81 and 82 of T-bridge 43 are suitably terminated at 83 and 84 in the same manner as at 24 and 25 in Fig. 1 and provided with frequency changing means 85 and 86 similar to frequency changing means 24 and 25 in Fig. 1. Any suitable coupling means 91 and 92, well known in the art, connect frequency changing means 85 and 86 to the receiver AFC IF 93.

In operation the circuit operates the same as Fig. 1, energy from local oscillator 65 enters the branch 66 and divides at the junction of the T-bridge 42 and passes on to the T-bridge 41 and 43. At the junction of the T-bridge 41, the local oscillator energy divides and passes on to the frequency changing means 54 and 55. This local oscillator energy arrives at frequency changing means 54 and 55 in 180° phase opposition. At the junction of the T-bridge 42 the local oscillator energy divides and passes on to the frequency changing means 85 and 86. This local oscillator energy arrives at frequency changing means 85 and 86 in 180° phase opposition. The radio frequency signal energy from source 44 enters through the branch 45 of the T-bridge 41, divides at the junction and passes on to the frequency changing means 54 and 55 arriving at these frequency changing means in phase. For the same reason as explained in the discussion relating to Fig. 1, energy from the local oscillator 65 will not pass into the branch 45 and, therefore, it cannot be radiated. The combination of energy from the local oscillator 65 and the source 44 at the frequency changing means 54 will produce IF energy at outputs 56 and 61. This IF energy may be in phase or in 180° opposition at the receiver IF 62 depending upon the manner in which the frequency changing means 54 and 55 are connected. The energy from the transmitter 75 enters the branch 76, divides at the junction of T-bridge 43 into branches 81 and 82 and arrives at the frequency changing means 85 and 86 in phase. The combination of energy from the local oscillator 65 and transmitter 75 at the frequency changing means 85 and 86 produces AFC IF energy at the outputs 91 and 92. This energy may be in phase or in 180° phase opposition upon arrival at the receiver depending upon the manner in which the frequency changing means 85 and 86 are connected. If any one or all of the mixers 54, 55, 85, and 86 are not perfectly matched to their respective wave guide branches, reflections will occur. Some of this reflected energy will be transmitted toward T-bridge 42. Use of the T-bridge 42 when it is matched is advantageous in that the T-bridge 42 acts as a decoupling device between T-bridge 41 and 43. Any energy from T-bridge 41 will be absorbed by the load 71 and a load in the branch 66 (not shown). The same statement will be true for any energy from T-bridge 43. To those skilled in the art it will be obvious that in T-bridge 41 the branches 45 and 63 may be interchanged, in T-bridge 42 the branches 66 and 72 may be interchanged and in T-bridge 43 the branches 74 and 76 may be interchanged. The discussion given about noise cancellation when the operation of the system shown in Fig. 1 was described also applies to the frequency changing circuits of Fig. 2. As explained in the discussion of Fig. 1, the variation in the impedance of the frequency changers may cause undesired reflections. In such cases the effect is minimized by the use of a quarter wave length insertion such as described for Fig. 1.

Figure 3:
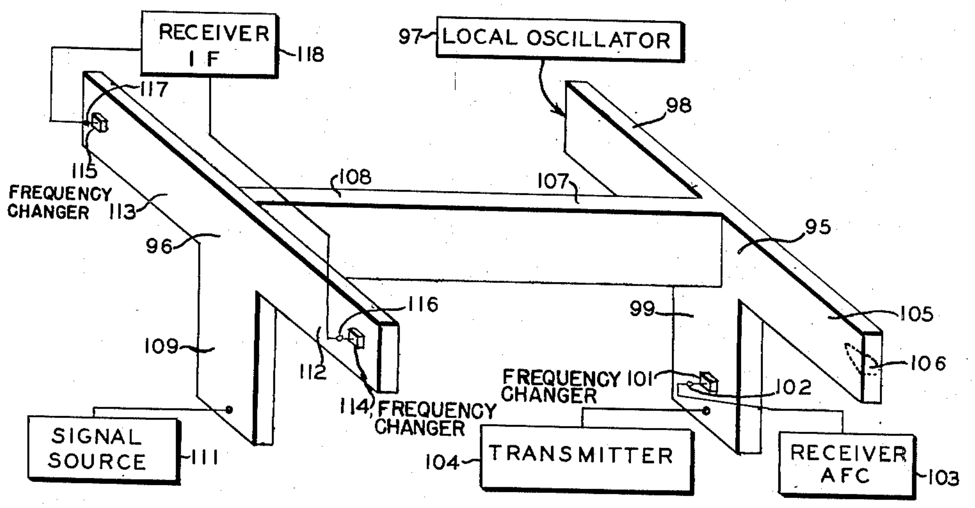
Fig. 3 shows another embodiment of the frequency changer circuit of Fig. 1 having separate signal and AFC outputs.

Referring now to Fig. 3, there is shown a balanced signal frequency changing circuit in combination with an unbalanced or single-ended, i. e., having one output, AFC frequency changing circuit which utilizes two T-bridges 95 and 96. A local oscillator 97 is connected to a branch 98 of the T-bridge 95. A branch 99 of the T-bridge 95 is suitably terminated and provided with a frequency changing means 101. Suitable coupling means 102 connects the frequency changing means 101 to a receiver AFC 103. A transmitter 104 also connects into the branch 99. A branch 105 of the T-bridge 95 is terminated in an absorptive load 106. A branch 107 of the T-bridge 95 is connected to a branch 108 of the T-bridge 96. A branch 109 connects the T-bridge 96 to a radio frequency signal source 111. Branches 112 and 113 are suitably terminated and provided with frequency changing means 114 and 115 similar to Fig. 1. Suitable coupling means 116 and 117 connect the frequency changing means 114 and 115 to a receiver IF 118.

In the operation of the apparatus shown in Fig. 3 energy from local oscillator 97 enters the branch 98 and divides at the junction of the T-bridge 95, part of the energy going into the branch 99 and a part of the energy going into the branch 107. Energy from transmitter 104 enters the branch 99 and is combined with energy from the local oscillator 97 at the frequency changing means 101 to give an AFC IF energy. The AFC IF energy is fed by the coupling means 102 to the receiver 103. The load 106 in branch 105 absorbs any energy which passes into that branch and prevents undesired reflections. The energy from the local oscillator 97 which enters the branch 107 continues through the branch 108. At the junction of the T-bridge 96 this local oscillator energy divides into the branches 112 and 113. This local oscillator energy arrives at the frequency changing means 114 and 115 in 180° phase opposition. Radio frequency signal energy from the signal source 111 enters the branch 109 and divides at the junction of the T-bridge 96 between branches 112 and 113. This signal energy arrives at the frequency changing means 114 and 115 in phase. The combination of local and signal energy at frequency changers 114 and 115 produces IF energy at the outputs 116 and 117 which may be in phase or in push-pull depending upon the manner in which the frequency changing means 114 and 115 have been connected. The discussion of noise cancellation in connection with the description of the operation of the apparatus shown in Fig. 1 applies to the signal frequency changing circuit shown in Fig. 3. As explained in the discussion of Fig. 1, the variation in the impedance of the frequency changers may cause undesired reflections. In such cases the effect is minimized by the use of a quarter wave length insertion such as described for Fig. 1. It is understood that branches 99 and 107 may be interchanged in T-bridge 95 and that branches 108 and 109 may be interchanged in T-bridge 96.

Figure 4:
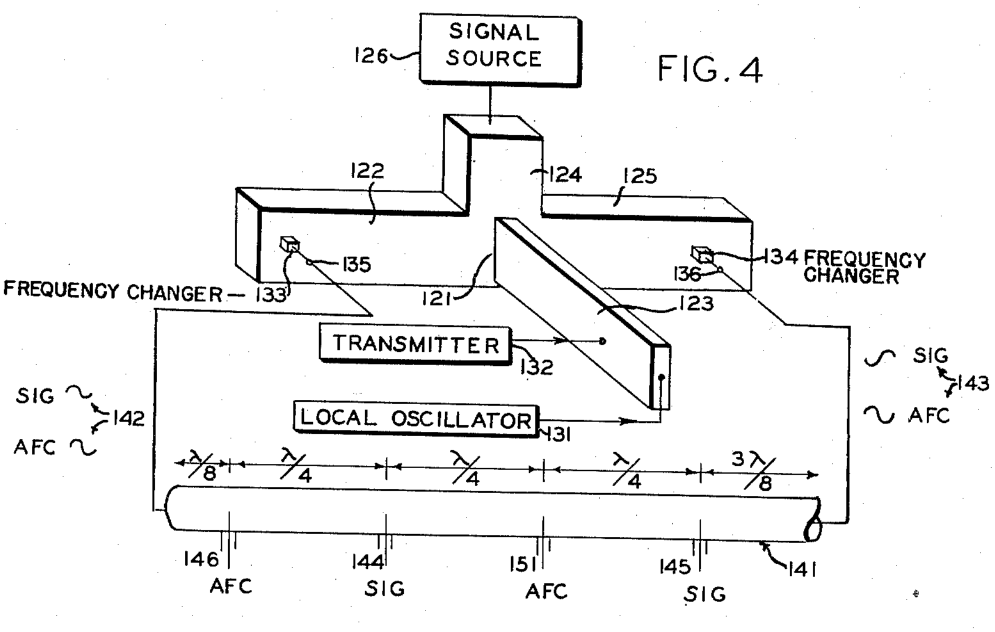
Fig. 4 shows still another embodiment of the frequency changer circuit of Fig. 1 having signal and AFC energy in a common output.

Referring now to Fig. 4, there is shown a balanced signal and balanced AFC frequency changing circuit which utilizes only one T-bridge. The T-bridge 121 includes branches 122, 123, 124, and 125. A signal source 126 is connected to the branch 124. A local oscillator 131 and a transmitter 132 are connected to the branch 123 in a manner well known to the art. Frequency changing means 133 and 134 and IF energy output couplings 135 and 136 are fitted into branches 122 and 125 in a manner well known in the art. Branches 122 and 125 are suitably terminated to maximize the output of IF energy at terminals 135 and 136. A section of coaxial line 141 is connected between the IF energy outputs 135 and 136. This coaxial line 141 is normally filled with a substance having a high dielectric constant so that its physical length for an electrical wave length at the intermediate frequency is not cumbersome. This invention, however, is not limited to the use of a coaxial line filled with a substance of high dielectric constant. Furthermore, the coaxial line 141 is designed to have a characteristic impedance approximately equal to the impedance of the frequency changing means 133 and 134. In Fig. 4 the total length of the line 141 is one and one-fourth wave lengths. Intermediate frequency energy outputs are provided at 144 and 145. The difference in electrical length from output 144 to the frequency changing means 133 and 134 is an odd number of half wave lengths. The difference in electrical length from output 145 to the frequency changing means 133 and 134 is an odd number of half wave lengths. Intermediate frequency energy outputs are also provided at 146 and 151. The difference in electrical length from output 146 to the frequency changing means 133 and 134 is an integral number of wave lengths. The difference in electrical length from output 151 to the frequency changing means 133 and 134 is an integral number of wave lengths. Integral number includes zero. It will be noted that the distance from any of the outputs in coaxial line 141 to either frequency changing means 133 or 134 is an odd number of one-eighth wave lengths. A definite advantage is thus achieved. The impedance at these points looking toward either frequency changing means is the characteristic impedance of the line 141 and is not a function of the impedance of the frequency changing means and is, therefore, a constant.

In the operation of the circuit of Fig. 4, the radio frequency signal from signal source 126 enters branch 124 and divides at the junction of the T-bridge 121 into branches 122 and 125. This divided energy reaches the frequency changing means 133 and 134 in phase. Energy from local oscillator 131 enters branch 123 and also divides at the junction of the T-bridge 121 into the branches 122 and 125. This divided energy from the local oscillator 131 reaches the frequency changing means 133 and 134 in 180° phase opposition. The IF energy output produced by the combination of the energy from source 126 and oscillator 131 appears at the outputs 135 and 136 will have a wave form and relative phase such as shown at 142 and 143 and marked SIG. In the case shown, energy at 136 in traveling to output 144 travels an electrical distance one-half wave length farther than does the energy at 135 in traveling to output 144. Since they start in 180° phase opposition, they arrive at 144 in phase. These same two energies at 135 and 136 also arrive at output 145 in phase. The signals at 144 and 145 are in 180° phase opposition and may be utilized in push-pull.

Energy from transmitter 132 enters branch 123 and divides at the junction of the T-bridge 121 into the branches 122 and 125. This divided energy from the transmitter 132 reaches the frequency changing means 133 and 134 in 180° phase opposition. The combination of the energies from the transmitter 132 and the local oscillator 131 produces AFC IF energy at the outputs 135 and 136. This energy has wave forms and relative phases as shown at 142 and 143 and marked AFC. In reaching the common output 146 the AFC IF energy at 136 travels one complete wave length farther than the corresponding AFC IF energy at 135. Since these energies were in phase at 135 and 136, they will arrive at 146 in phase. Output 151, which is one-half wave length away from output 146, will also have an AFC IF energy output, but it will be in 180° phase opposition to the energy at 146, and these energies may, therefore, be combined in push-pull. If either frequency changing means 133 or 134 is reversed in its manner of connection, the wave forms associated with that frequency changing means will be inverted. In such a case it will be obvious to those skilled in the art that the AFC output will appear at what is now the signal output and vice versa.

While there has been described what is at present considered the preferred embodiments of the invention, it will be obvious to those skilled in the art that various changes and modifications may be made therein without departing from the invention, and it is, therefore, aimed in the appended claims to cover all such changes and modifications as fall within the true scope and spirit of the invention.

I claim:

1. A radio frequency mixer comprising a T-bridge including four waveguide branches mounted together at a point, a first pair of said branches being arranged to have the electric lines of force therein mutually perpendicular, the remaining pair of said branches being arranged symmetrically with respect to a plane which passes through the axes of both of said branches of said first pair, a non-linear frequency mixer mounted in each branch of one of said pairs of branches, means for introducing a radio frequency signal into one of the branches of the other of said pairs of branches, means for introducing a local oscillator signal into the other of said branches of said other pair of branches, and means for combining the intermediate frequency signal outputs from said mixers.

2. A radio frequency mixer comprising a T-bridge including four waveguide branches mounted together at a point, a first pair of said branches being arranged mutually perpendicular and being oriented to have the electric lines of force therein mutually perpendicular, the remaining pair of said branches being colinear and arranged symmetrically and perpendicularly with respect to a plane which passes through the axes of both of said branches of said first pair, a non-linear frequency mixer mounted in each branch of one of said pairs of branches, means for introducing a radio frequency signal into one of the branches of the other of said pairs of branches, means for introducing a local oscillator signal into the other of said branches of said other pair of branches, and means for combining the intermediate frequency signal outputs from said mixers.

3. A radio frequency mixer comprising a first T-bridge including four waveguide branches mounted together at a point, a first pair of branches of said T-bridge being arranged to have the electric lines of force therein mutually perpendicular, the remaining pair of branches of said first T-bridge being arranged symmetrically with respect to a plane which passes through the axes of both branches of said first pair of branches of said first T-bridge, a non-linear frequency mixer mounted in each branch of one of the above-mentioned pairs of branches of said first T-bridge, means for introducing a first radio frequency signal into one of the branches of the other pair of branches of said first T-bridge, a second T-bridge including four waveguide branches mounted together at a point, a first pair of branches of said second T-bridge being arranged to have the electric lines of force therein mutually perpendicular, the remaining pair of branches of said second T-bridge being arranged symmetrically with respect to a plane which passes through the axes of both branches of said first pair of branches of said second T-bridge, a non-linear frequency mixer mounted in each branch of one of the abovementioned pairs of branches of said second T-bridge, means for introducing a second radio frequency signal into one of the branches of the other pair of branches of said second T-bridge, the other branches of said other pairs of branches of both of said T-bridges being coupled together, means for introducing a local oscillator frequency signal into said last-mentioned branches, means for deriving from said frequency mixers mounted in said first T-bridge a first intermediate frequency signal, and means for deriving from said frequency mixers mounted in said second T-bridge a second intermediate frequency signal.

4. A radio frequency mixer according to claim 3 in which said means for inserting the local oscillator frequency signal comprises a third T-bridge including four waveguide branches mounted together at a point, a first pair of branches of said third T-bridge being arranged to have the electric lines of force therein mutually perpendicular, the remaining pair of branches of said third T-bridge being arranged symmetrically with respect to a plane which passes through the axes of both branches of said first pair of branches of said third T-bridge, one of said pairs of branches of said third T-bridge coupling said other branches of said other pairs of branches of both said first and second T-bridges, and means for introducing the local oscillator frequency signal into one of the branches of the other pair of branches of said third T-bridge.

5. A radio frequency mixer according to claim 4 in which said branches of said first pair of branches of each of said T-bridges are mutually perpendicular and said branches of said remaining pair of branches of each of said T-bridges are colinear and perpendicular to both of said branches of said first pair.

6. A radio frequency mixer according to claim 5 in which all of said waveguide branches of all said T-bridges are terminated in their characteristic impedances.

7. A radio frequency mixer comprising a first T-bridge including four waveguide branches mounted together at a point, a first pair of branches of said first T-bridge being arranged to have the electric lines of force therein mutually perpendicular, the remaining pair of branches of said first T-bridge being arranged symmetrically with respect to a plane which passes through the axes of both of said first pair of branches of said first T-bridge, a non-linear frequency mixer mounted in each branch of one of the above-mentioned pairs of branches of said first T-bridge, means for introducing a first radio frequency signal into one of the branches of the other pair of branches of said first T-bridge, a second T-bridge including four waveguide branches mounted together at a point, a first pair of branches of said second T-bridge being arranged to have the electric lines of force therein mutually perpendicular, the remaining pair of branches of said second T-bridge being arranged symmetrically with respect to a plane which passes through the axes of both of said first pair of branches of said second T-bridge, the other branch of said other pair of branches of said first T-bridge being coupled to one branch of one of said pairs of branches of said second T-bridge, a non-linear frequency mixing device mounted in the other branch of said one pair of branches of said second T-bridge, means for introducing a second radio frequency signal in said other branch of said one pair of branches of said second T-bridge, means for introducing a local oscillator frequency signal into one branch of the other pair of branches of said second T-bridge, means terminating the other branch of said other pair of branches of said second T-bridge in its characteristic impedance, means for deriving a first intermediate frequency signal from said mixers in said first T-bridge, and means for deriving a second intermediate frequency signal from said mixer in said second T-bridge.

8. A radio frequency mixer comprising a T-bridge including four waveguide branches mounted together at a point, a first pair of said branches arranged to have the electric lines of force therein mutually perpendicular, the remaining pair of said branches being arranged symmetrically with respect to a plane which passes through the axes of both of said branches of said first pair, a non-linear frequency mixer mounted in each branch of one of said pairs of branches, means for introducing a first radio frequency signal into one of the branches of the other of said pairs of branches, means for introducing a second radio frequency signal into the other branch of said other pair of branches, means for introducing a local oscillator frequency signal into said other branch of said other pair of branches, transmission means having a length an odd multiple of a quarter wavelength of a beat frequency of said local oscillator and radio frequency signals and coupling said mixers together, output means coupled to said transmission means at a point spaced from both said mixers by amounts that differ by an odd number of half wavelengths of said beat frequency for obtaining a first intermediate frequency signal from the beating of said local oscillator and said first radio frequency signals, and means coupled to said transmission means at a point spaced from both of said mixers by amounts that differ by an integral number of whole wavelengths of said beat frequency signal for obtaining a second intermediate frequency signal from the beating of said local oscillator and said second radio frequency signals.

9. Apparatus for mixing periodic waves having different frequencies comprising: a double T-shaped wave-guide assembly, having a cross-arm common to both T's and a pair of branch arms perpendicular to said cross-arm and to each other, receptive of said waves, for deriving from one, two constituent waves of opposite phase, and from another, two constituent waves of like phase; and means, receptive of all of said constituent waves, for deriving therefrom an output wave whose frequency is an arithmetic function of the frequencies of the initial waves.

10. Apparatus for mixing periodic waves having different frequencies comprising: a double T-shaped wave-guide assembly, having a cross-arm common to both T's and a pair of branch arms perpendicular to said cross-arm and to each other, receptive of said waves, for deriving from one, two constituent waves of opposite phase, and from another, two constituent waves of like phase; means, terminating said cross-arm, for combining said first-named constituent waves, respectively, with said second-named constituent waves to derive therefrom two resultant waves of opposite phase; and means for combining said resulant waves to derive therefrom an output wave whose frequency is an arithmetic function of the frequencies of the initial waves.

11. Apparatus for mixing periodic waves having different frequencies comprising: a double T-shaped wave-guide assembly, having a cross-arm common to both T's and a pair of branch arms perpendicular to said cross-arm and to each other, receptive of said waves, for deriving from one, two constituent waves of opposite phase, and from another, two constituent waves of like phase; a pair of oppositely-disposed, series-connected, non-linear impedances terminating said cross-arm for combining said first-named constituent waves, respectively, with said second-named constituent waves to derive therefrom two resultant waves of opposite phase; and means for combining said resultant waves to derive therefrom an output wave whose frequency is an arithmetic function of the frequencies of the initial waves.

12. Apparatus for mixing periodic waves having different frequencies comprising: means, receptive of said waves, for dividing the same into two oppositely-phased pairs of similarly-phased constituent waves, and two additional pairs of constituent waves, the waves of one of said additional pairs being of like phase and the waves of the other additional pair being of opposite phase; means for combining the constituent waves of each of said first-named pairs to derive therefrom two resultant waves of like phase, and for combining the constituent waves of each of said second-named pairs to derive therefrom two resultant waves of opposite phase; and means for so combining said first-named resultant waves as to produce a zero output, and for so combining said second-named resultant waves as to produce an output wave whose frequency is an arithmetic function of the frequencies of the initial waves.

13. Apparatus for mixing periodic waves having different frequencies comprising: a double T-shaped wave-guide assembly, having a cross-arm common to both T's and a pair of branch arms perpendicular to said cross-arm and to each other, receptive of said waves, for dividing the same into two oppositely-phased pairs of similarly-phased constituent waves, and two additional pairs of constituent waves, the waves of one of said additional pairs being of like phase and the waves of the other additional pair being of opposite phase; means for combining the constituent waves of each of said first-named pairs to derive therefrom two resultant waves of like phase, and for combining the constituent waves of each of said second-named pairs to derive therefrom two resultant waves of opposite phase; and means for so combining said first-named resultant waves as to produce a zero output, and for so combining said second-named resultant waves as to produce an output wave whose frequency is an arithmetic function of the frequencies of the initial waves.

14. Apparatus for mixing periodic waves having different frequencies comprising: a double T-shaped wave-guide assembly, having a cross-arm common to both T's and a pair of branch arms perpendicular to said cross-arm and to each other, receptive of said waves, for dividing the same into two oppositely-phased pairs of similarly-phased constituent waves, and two additional pairs of constituent waves, the waves of one of said additional pairs being of like phase and the waves of the other additional pair being of opposite phase; a pair of oppositely-disposed, series-connected, non-linear impedances terminating said cross-arm for combining the constituent waves of each of said first-named pairs to derive therefrom two resultant waves of like phase, and for combining the constituent waves of each of said second-named pairs to derive therefrom two resultant waves of opposite phase; and means for so combining said first-named resultant waves as to produce a zero output, and for so combining said second-named resultant waves as to produce an output wave whose frequency is an arithmetic function of the frequencies of the initial waves.

15. A wave-guide assembly comprising: a main wave-guide section having a non-linear impedance at each of the opposite ends thereof; and a pair of branch wave-guide sections, perpendicular to said main wave-guide section and to each other, extending outwardly from said main wave-guide section.

16. A wave-guide assembly comprising: a main wave-guide section having a crystal detector at each of the opposite ends thereof; and a pair of branch wave-guide sections, perpendicular to said main wave-guide section and to each other, extending outwardly from said wave-guide section.

17. A wave-guide assembly comprising: a main wave-guide section having a pair of oppositely-disposed, series-connected, non-linear impedances at the opposite ends thereof; and a pair of branch wave-guide sections, perpendicular to said main wave-guide section and to each other, extending outwardly from said main wave-guide section.

18. A wave-guide assembly comprising: a main wave-guide section having a pair of oppositely-disposed, series-connected, crystal detectors at the opposite ends thereof; and a pair of branch wave-guide sections, perpendicular to said main wave-guide section and to each other, extending outwardly from said main wave-guide section.

ROBERT H. DICKE.

References Cited in the file of this patent

UNITED STATES PATENTS

| Number | Name | Date |
|---|---|---|
| 2,142,159 | Southworth | Jan. 3, 1939 |
| 2,253,589 | Southworth | Aug. 26, 1941 |
| 2,257,783 | Bowen | Oct. 7, 1941 |
| 2,382,693 | Dallenbach et al. | Aug. 14, 1945 |
| 2,413,939 | Benware | Jan. 7, 1947 |
| 2,436,828 | Ring | Mar. 2, 1948 |
| 2,445,895 | Tyrrell | July 27, 1948 |
| 2,445,896 | Tyrrell | July 27, 1948 |